United States Patent [19]

Gold et al.

[11] Patent Number: 4,713,873
[45] Date of Patent: Dec. 22, 1987

[54] WELD FIXTURE MOUNTING METHOD

[75] Inventors: Raymond D. Gold, Waukee; Leo W. Riegel, Ankeny, both of Iowa

[73] Assignee: Deere & Company, Moline, Ill.

[21] Appl. No.: 860,958

[22] Filed: May 8, 1986

Related U.S. Application Data

[62] Division of Ser. No. 742,243, Jun. 7, 1985, Pat. No. 4,641,820.

[51] Int. Cl.[4] .............................................. B23Q 7/00
[52] U.S. Cl. ...................................... 29/559; 29/466; 29/468
[58] Field of Search ................. 29/465, 466, 467, 468, 29/464, 469, 559; 269/71, 296, 289 MR, 60, 58, 61, 46, 51; 414/736; 82/40 R, 41, 39, 38 R

[56] References Cited

U.S. PATENT DOCUMENTS

| | | | |
|---|---|---|---|
| 1,834,294 | 12/1931 | Spahn | 269/71 X |
| 2,741,830 | 4/1956 | Lewis | 29/467 |
| 3,758,941 | 9/1973 | Jackson et al. | 29/464 |
| 4,390,172 | 6/1983 | Gotman | 29/464 X |
| 4,452,558 | 6/1984 | Muraguchi | 269/296 X |

Primary Examiner—Howard N. Goldberg
Assistant Examiner—Joseph M. Gorski

[57] ABSTRACT

Precise and fastenerless connection of a fixture to rotatable headstock and tailstock positioners is provided by a slidably engageable ball and socket arrangement located on the headstock positioner and on one end of the fixture, and by a tapered roller located at the opposite end of the fixture which is cradled between two grooved rollers located on the tailstock positioner. The ball and socket centers the headstock end of the fixture on the rotational axis of the headstock positioner while the tapered roller and grooved rollers locate the fixture linearly as well as centrally. The overall fixture support arrangement permits misalignment of the headstock and tailstock positioners without binding of the fixture. A second slidably engageable connecting device at the headstock end assures precise rotation of the fixture in unison with the headstock positioner.

21 Claims, 4 Drawing Figures

WELD FIXTURE MOUNTING METHOD

This is a division of application Ser. No. 742,243, filed June 7, 1985, now U.S. Pat. No. 4,641,820.

BACKGROUND OF THE INVENTION

The present invention relates generally to weld fixtures or similar-type devices for supporting a workpiece, and more specifically to an improved mounting for such a fixture.

Fixtures for supporting a workpiece and, for example, positioning a workpiece to be welded at a specific location, typically include a bar or generally open framework which is rigidly bolted or pinned at opposite ends in some way to the headstock and tailstock positioners of a supportive device. The workpiece or workpieces are mounted in the fixture, and the fixture is attached to the headstock and tailstock positioning devices. The fixture may then be rotated to permit easy access to the workpieces or to provide precise alignment of the workpieces with an automatic machine such as a robotic welder.

Several problems exist with presently available fixture mountings. The headstock and tailstock positioner center lines must be carefully aligned since any misalignment can cause serious binding problems and render the device nonfunctional. If the headstock and tailstock devices are adjustable vertically, their movement must be precisely in unison, a requirement which greatly increases the cost of the devices which effect the vertical adjustment.

Methods of attaching the fixtures, including bolting or pinning up to eight fasteners at each end of a fixture, are usually awkward and time-consuming. The large amount of hardware which has to be connected between the fixture and the headstock and tailstock positioners is rather cumbersome and difficult to keep organized. Heretofore, there has been no reliable and quick attaching method for securing the weld fixtures to the positioning equipment.

The supportive device is often utilized to precisely position the fixture for an automatic operation such as robotic welding, and a keyway or similar indexing structure is provided at the headstock positioner to assure that the fixture rotates in unison with the positioner. However, there is some keyway backlash which of course is magnified as a workpiece extends radially outwardly beyond the center of rotation of the fixture. This backlash error can adversely affect the accuracy of the automatic operation.

It is therefore an object of the present invention to provide an improved mounting method and apparatus for securing weld fixtures or the like to positioning equipment. It is a further object to provide such a mounting method and apparatus which allows quick and precise attachment of the fixtures to the headstock and tailstock positioners.

It is another object of the present invention to provide an attaching mounting method and apparatus for a fixture which permits rapid changeover of the fixture to the positioner headstock and tailstock devices.

It is yet another object of the present invention to provide an attaching mounting for a fixture which reduces the amount of hardware necessary to secure the fixture to the positioning equipment. It is a further object to provide such a structure which may be simply slipped into position and requires no bolting or pinning.

It is still another object to provide such a mounting which can be easily attached to most any fixture and positioner.

It is a further object to provide an attaching mounting for a headstock positioner which reduces backlash error and assures more precise and repeatable positioning of the fixture. It is yet another object to provide such a mounting in combination with a tailstock positioner mounting, wherein the latter precisely locates the fixture linearly.

It is still another object of the present invention to provide a quick attach mounting method and apparatus for securing weld fixtures, including relatively massive fixtures, or the like to positioning equipment wherein precise alignment of the headstock and tailstock center lines is no longer necessary. It is yet another object to provide such a mounting apparatus which permits the headstock and tailstock positioners to be raised and lowered in unison while permitting the headstock and tailstock positioners to become slightly misaligned without causing binding of the fixture.

In accordance with the above objects a quick attach mounting for securing a fixtufre to positioning equipment includes a ball and socket arrangement associated with the headstock positioner and a pair of grooved rollers associated with the tailstock positioner. The ball is located on the center of rotation of the headstock positioner and a socket is secured to one end of the fixture for receipt onto the ball. On the opposite end of the fixture, a tapered roller is secured on the rotational axis of the fixture. The corresponding tailstock positioner includes a pair of grooved rollers which receive and precisely locate the tapered roller. The ball centers the headstock end of the fixture with respect to the rotational axis of the positioner, while the grooved rollers cradle the tapered roller to locate the tailstock end of the fixture linearly and centrally with respect to the axis of rotation. The headstock positioner includes an arm supporting a second ball radially outwardly from the centrally located ball, and the headstock end of the fixture includes a radially outboard alignment device for receiving the ball and constraining the fixture to rotate precisely in unison with the headstock device. The ball and socket and ball and outboard device permit the headstock end of the fixture to be simply slipped into position, and after the headstock end is positioned, the tapered roller on the tailstock end is lowered onto the grooved rollers of the tailstock positioner to provide automatic alignment of the fixture with the positioning equipment. The mounting arrangement also permits misalignment of the headstock and tailstock positioners without causing any binding or other serious problems with the fixture. Easy attachment of the fixture to the headstock and tailstock positioners with a corresponding reduction of set-up time is provided. No additional mounting bolts or pins are required so that much of the hardware commonly associated with other fixture mountings is eliminated. Since compensation for misalignment of the headstock and tailstock positioners is provided, it is now possible to more effectively and at less cost provide height adjustment for the headstock and tailstock positioners. The radially outboard alignment device reduces the amount of play between the headstock positioner and the fixture for more accurate and repeatable positioning.

These and other objects, features and advantages of the present invention will become apparent to those

DESCRIPTION OF THE PREFERRED EMBODIMENT

Figure 1:
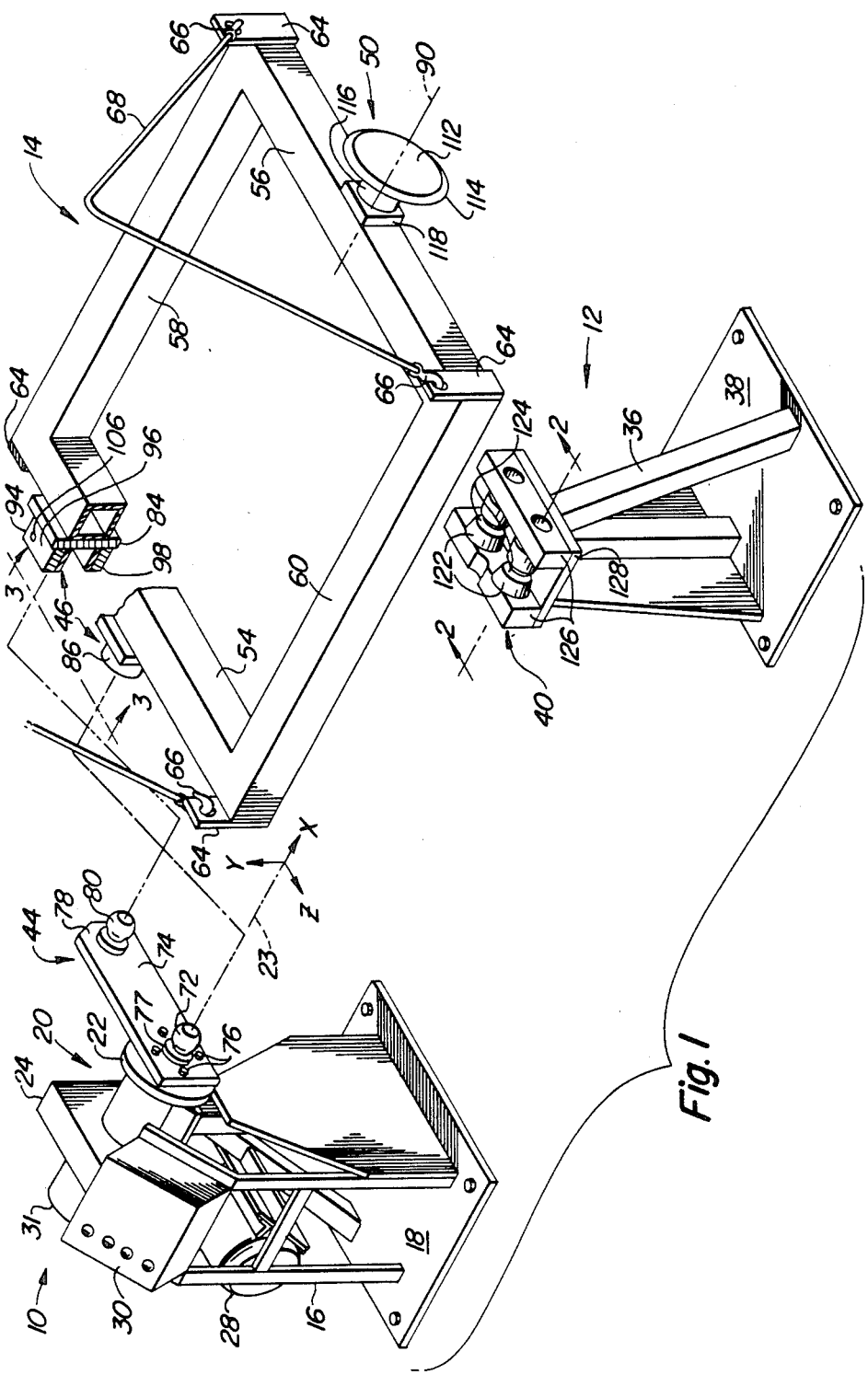
FIG. 1 is an exploded view, partially in section, showing a weld fixture and the associated headstock and tailstock positioning devices with the quick attach mounting of the present invention attached thereto.

Referring now to FIG. 1, therein is shown fixture positioning equipment including a headstock positioner indicated generally at 10 and a tailstock positioner indicated generally at 12 which are spaced apart sufficiently to receive therebetween a fixture 14 which is adapted to support one or more workpieces (not shown).

The headstock positioner 10 includes a main frame 16 carried on a horizontal plate 18. A headstock drive, indicated generally at 20, includes a rotatable plate 22 having an axis of rotation 23 and operably connected to a servomotor drive 24 which is powered by a motor 28. A control box 30, connected to the drive 24 and to an encoder 31, precisely controls the rotation of the plate 22 for accurate positioning of the fixture 14.

The tailstock positioner 12 includes a main frame 36 supported on a support plate 38. The upper end of the main frame 36 supports a roller assembly 40 generally aligned with, but slightly below, the extension of the rotational axis 23 of the plate 22 on the headstock positioner 10. The headstock and tailstock frames 16 and 36, respectively, may either be fixed to a supporting floor or they may be connected, for vertical movement generally in unison, to elevating devices (not shown) for raising and lowering the headstock and tailstock positioners, for example, to accommodate rotational movement of the fixture 14 without interference between the floor and fixture.

The mounting structure for the headstock positioner 10 includes a headstock mounting portion 44 connected to the plate 22 for rotation therewith and a mating headstock device 46 connected to the headstock end of the fixture 14. The portion 44 and device 46 are slidably engageable and facilitate fastenerless mounting of the fixture 14 to the headstock positioner 10. The mounting structure for the tailstock positioner 12 includes the roller assembly 40 and a mating tailstock device 50 connected to the tailstock end of the fixture 14. The assembly 40 and device 50 permit the tailstock end of the fixture 14 to be simply lowered to and cradled in the desired position after the headstock end is slid into position.

Figure 4:
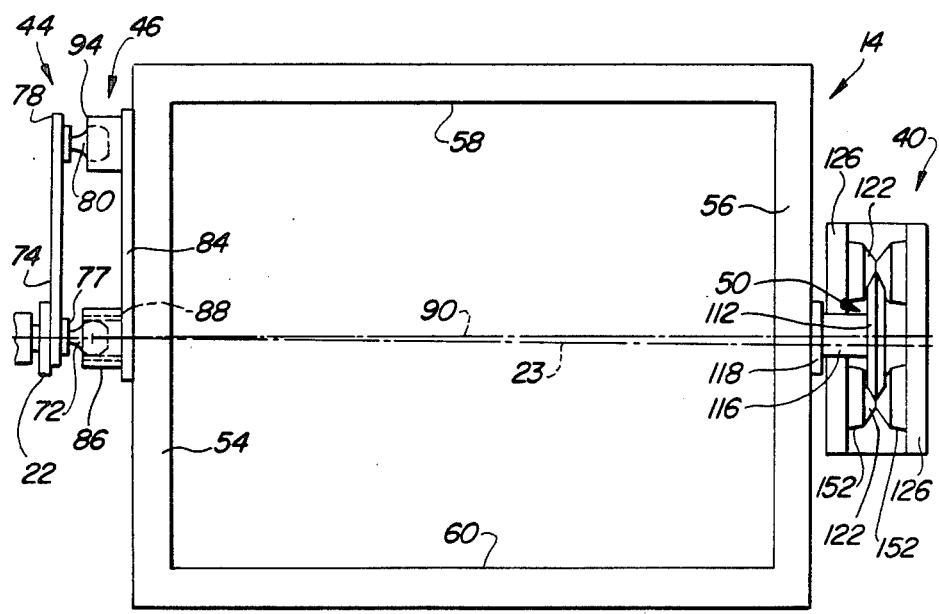
FIG. 4 is a top view of the fixture and headstock and tailstock mounting structures, and illustrating the compensation for misalignment of the headstock and tailstock positioners.

The fixture 14, as shown in FIGS. 1 and 4, includes first and second ends 54 and 56 spaced apart by legs 58 and 60 to form a generally open and rectangular framework for supporting various types of workpieces. Other types of fixtures may be used also, such as an elongated beam. As best seen in FIG. 1, the fixture 14 is formed from tubular members having generally rectangular cross sections, and the headstock and tailstock devices 46 and 50 are attached to the outwardly facing walls of the tubular members forming the ends 54 and 56, respectively. Brackets 64 are connected adjacent the four corners of the fixture 14 for receiving hooks 66 or the like located on conventional sling or crane devices 68 which are movable both horizontally and vertically to position the fixture 14 on the headstock and tailstock positioners 10 and 12.

The headstock mounting portion 44 includes a ball 72 with a hardened wear-resistant surface connected to the plate 22 and centered on the axis of rotation 23 of the plate 22. An elongated arm 74 is connected at its inner end by bolts 76 and dowels (not shown) to the plate 22 and extends radially outwardly from the plate at generally a right angle to the axis of rotation 23. The ball 72 includes a shoulder 77 which seats in a bored recess in the arm 74. The arm 74 terminates in an outer end 78 which supports a second ball 80 a substantial distance radially outwardly of the first ball 72. The mating headstock device 46 includes a plate 84 fixed to the outwardly facing wall of the end 54 and supporting a ball socket 86 at a central location on the end 54. The ball socket 86 is adapted for receipt onto the ball 72 to center the fixture 14 on the headstock positioner 10. The ball socket 86 is a generally straight-walled cylindrical member having an inner diameter approximately equal to but slightly larger than the diameter of the ball 72. The ball 72 and ball socket 86 locate the end 54 centrally (that is, in the Y and Z directions as shown by the coordinates in FIG. 1) with respect to the rotational axis 23 of the headstock positioner 10. In the preferred embodiment, the cylindrical ball socket 86 includes an inner hardened wear lining 88. The cylindrical axis of the ball socket 86, indicated generally at 90, extends through the central portion of the fixture 14 and through the center of the mating tailstock device 50.

The headstock device 46 also includes a channel- or track-like outboard alignment device 94 located radially outwardly of the ball socket 86 and adapted for receiving the ball 80. The device 94 includes vertically spaced bars 96 and 98 supported on the plate 84 in parallel relationship. Flat wear liners 102 and 104 are connected to the inner surfaces of the bars 96 and 98, respectively, by fasteners such as socket head cap screws 106. The wear liners 102 and 104 are spaced apart in adequate distance to permit the ball 80 to engage and enter the track-like alignment device 94 and yet provide a close fit between the ball 80 and the portion 94 so that the fixture 14 is constrained to assume the same angular position as the arm 74. The ball and alignment device arrangement of elements 80 and 94 permit some movement of the end 54 of the fixture 14 towards and away from the arm 74 while the ball and socket arrangement of elements 72 and 86 centrally locate the end of the fixture 14 on the axis 23.

Figure 2:
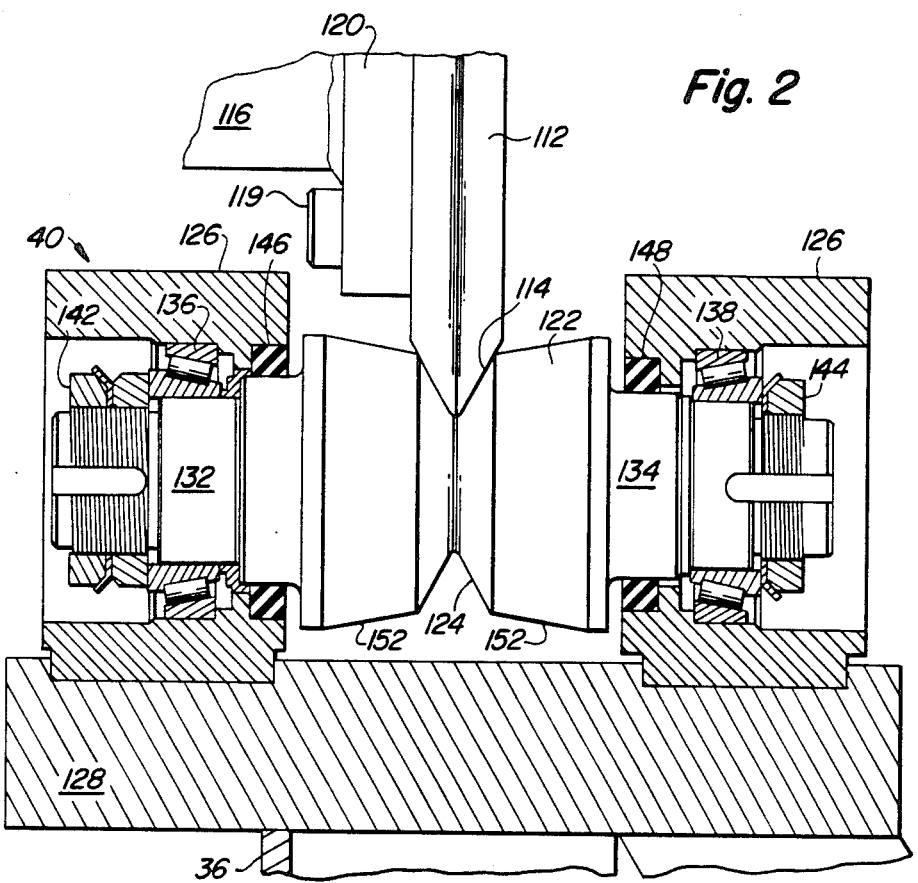
FIG. 2 is a sectional view taken along lines 2—2 of FIG. 1 and showing the tapered roller positioned in the grooved rollers of the mounting.
Figure 3:
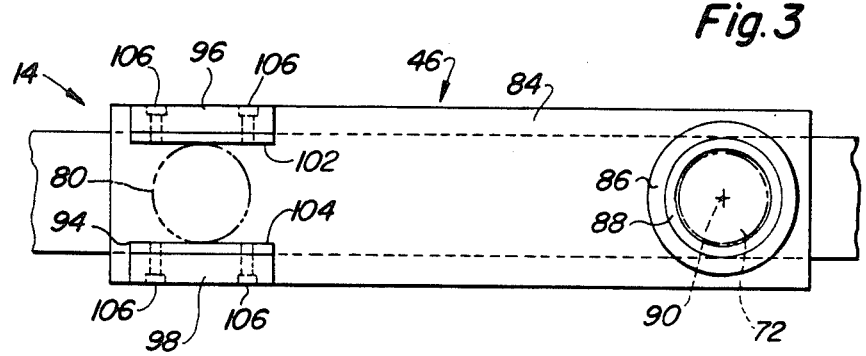
FIG. 3 is a view taken essentially along lines 3—3 of FIG. 1 and showing the ball and socket and ball and outboard alignment device of the mounting for the headstock end of the fixture.

The tailstock device 50 is attached centrally on the tailstock end 56 of the fixture 14 and includes a circular tapered roller 112 having an axis corresponding to the axis 90 of the ball socket 86. The roller 112 includes an outer tapered portion 114 and is supported by a cylindrical stem or spacer 116 connected to a plate 118 which in turn is fixed to the outer face of the tubing which forms the end 56. The roller 112 is attached by cap screws 119 (FIG. 2) to a circular plate 120 welded to the spacer 116, and can be removed to attach a round plate and shaft extension (not shown) so the fixture 14 can be mounted on conventional positioning equipment.

The roller assembly 40 includes a pair of generally identical tapered rollers 122 which are horizontally spaced and which include a tapered groove 124, the angle of which is generally identical to the angle of the taper 114 on the roller 112. The tapered rollers 122 are supported for rotation about generally parallel and horizontal axes by bearing blocks 126 which are transversely spaced apart on a horizontal plate 128 fixed to the top of the main frame 36 of the tailstock positioner 12. The tapered rollers 122 include axially extending shafts 132 and 134 (FIG. 2) which are supported by tapered bearings 136 and 138 pre-loaded in the axial direction by threaded nut arrangements 142 and 144, respectively. Flexible seals 146 and 148 are provided between the bearings and the tapered rollers 122. In the preferred embodiment, the angle of the taper 114 and of the groove 124 is approximately sixty degrees. Alternatively, the roller 112 may be fabricated with a bullet-nose taper, rather than the straight-sided tapered portion 114 shown in the figures, to reduce wear on the rollers 122 during misalignment. Also, at least one of the rollers 122 is fixed in the axial direction (that is, along the X-axis of FIG. 1) to precisely locate the roller 112 and thus the fixture 14 linearly. If desired, one of the rollers 122 and its associated bearing may be located in a sleeve to permit axial movement in the bearing block 126 to accommodate the roller wobble that occurs if the axes 23 and 90 are not aligned, as would happen, for example, if the headstock and tailstock positioners 10 and 12 were slightly out of alignment. However, it has been found that the two axially fixed rollers 122 work adequately without binding even when the positioners 10 and 12 are grossly misaligned up to several inches.

When the fixture 14 is supported on the headstock and tailstock positioners 10 and 12, the tapered roller 112 is cradled between the two grooved rollers 122. The tapered rollers 122 are mounted in such a manner that when the headstock and tailstock positioners 10 and 12 are in their proper locations, the fixture 14 will be supported such that the axis 90, which passes through the cylindrical ball socket 86 and the tailstock device 50, will coincide with the axis of rotation 23 of the rotatable plate 22. The roller assembly 40 and the mating tailstock device 50 assure that the fixture 14 is precisely located in the axial direction (that is, in the X direction of FIG. 1 or to the left and right as viewed in FIG. 4) as the taper 114 cradles in the tapered grooves 124 of the rollers 122. The roller assembly 40 and mating tailstock device 50 therefore also assure that the tailstock end of the fixture 14 is centrally located (in the Y and Z directions). The rollers 122 each include outward tapered portions 152 which slope gently toward the tapered groove 124 to help guide the tapered roller 112 to the proper cradled location between the rollers 122 when the fixture 14 is lowered onto the roller assembly 14. Therefore, it is evident that as the tailstock end of the fixture 14 is lowered toward the tailstock positioner 12, the fixture 14 will automatically be guided toward the proper location and will be precisely located as the tapered roller 112 settles into the tapered grooves 124. Because of the cradling action, heavy fixtures will settle more positively to thereby assure very accurate and repeatable fixture positioning.

In operation, the fixture 14 is picked up by the sling or crane devices 68 and is moved toward the headstock positioner 10 in an attitude which is generally identical to the attitude of the arm 74 on the headstock mounting portion 44. As shown in FIG. 1, both the arm 74 and the fixture 14 are supported generally horizontally. The end 54 of the fixture 14 is moved horizontally and lowered so that the socket 86 of the mating headstock device 46 slides onto the ball 72 of the mounting portion 44. At the same time the ball 80 slides into the track-like alignment device 94. The particular ball and socket and ball and alignment device arrangement permit mating of the mounting portion 44 and the headstock device 46 even if the central axis 90 of the fixture 14 is offset (FIG. 4) from the axis of rotation 23 of the plate 22. The spherical surfaces of the balls 72 and 80 act as locating structures to guide the mating portions 86 and 94 smoothly toward their desired final positions. After the mating headstock device 46 is generally located with respect to the mounting portion 44, the end 56 of the fixture 14 is lowered so that the tapered roller 112 engages the rollers 122 which automatically guide the tailstock device 50 to the proper cradled location within the rollers 122. As the tapered roller 112 settles into the grooves 124, the fixture 14 will be precisely located both centrally and in the linear direction. The slings 68 are then removed. The ball 72 and the socket 86 at the headstock end of the fixture 14 assure that the headstock end is precisely located on the axis of rotation of the rotatable plate 22. Once the tapered roller 112 has settled into the proper location on the roller assembly 40, the cylindrical axis 90 will correspond to the axis of rotation 23 provided the headstock and tailstock positioners 10 and 12 are properly located with respect to each other. However, if for any reason the positioners 10 and 12 are not precisely located, for example, when vertically adjustable positioners are utilized, the cradling arrangement of the roller assembly 40 and the mating tailstock device 50, and the ball and socket and ball and alignment device arrangement of the mounting portion 44 and mating headstock device 46 prevent any binding of the fixture 14 which would otherwise occur if the fixture were rigidly pinned or bolted to the headstock and tailstock positioners. The drive 24 is controlled by the box 30 to precisely locate the fixture 14 for the desired operation, such as robotic welding.

To remove the fixture 14, the slings 68 are reattached and the tapered roller 112 is lifted from the roller assembly 40. The fixture 14 is then moved away from the headstock positioner 10, and the mating headstock device 46 simply slips out from the balls 72 and 80, thereby completely releasing the fixture 14 from the positioning equipment without removing pins or bolts.

The radially outward alignment device 94 preferably holds the ball 80 to within a tolerance of several thousandths of an inch, significantly reducing the amount of backlash or play that would otherwise occur in a keyed connection located close to the axis 23. Also, the tolerance between the ball 76 and its socket 86 is on the order of only several thousandths of an inch.

It is possible to reverse the location of the balls 72 and 80 and the mating portions 86 and 94. However, since the balls 72 and 80 are more expensive to manufacture, it is preferred that they remain attached to the headstock positioner 10 and that the fixtures 14 be fitted with the less expensive mating devices. In this way, only two balls for each positioner equipment location are required regardless of the number of fixtures which will be attached to the equipment.

Having described the preferred embodiment, it will be apparent that modifications can be made without departing from the scope of the invention as defined in the accompanying claims.

We claim:

1. A method of connecting an elongated fixture to rotatable headstock and tailstock positioners for rotation about a rotational axis, the fixture having a headstock and a tailstock end, the method comprising the steps of:
    (a) providing slidably engageable mounting structure on the headstock positioner and complementary mating structure on the headstock end of the fixture;
    (b) providing a roller on the tailstock end of the fixture and a complementary roller assembly on the tailstock positioner;
    (c) centering the headstock end of the fixture with respect to the headstock positioner, said step of centering including slidably engaging the mounting structure and mating structure; and
    (d) locating the fixture both linearly and centrally with respect to both the headstock and tailstock devices, said step of locating including lowering the tailstock roller onto the roller assembly and urging the tailstock roller to a preselected axial location while causing sliding movement between the mounting structure and the mating structure, thereby accommodating axial movement of the fixture as the fixture is located linearly.

2. The method as set forth in claim 1 wherein the step (b) includes providing a tapered roller and a complementary grooved roller assembly, said step of locating further including directing the tapered roller into the groove of the complementary roller assembly.

3. The method as set forth in claim 2 wherein step (b) further includes providing the grooved roller assembly with a pair of spaced, grooved rollers and step (d) includes cradling the tapered roller between the grooved rollers.

4. The method as set forth in claim 1 wherein step (a) includes mounting a ball on the headstock positioner on the rotational axis and a complementary socket on the headstock end of the fixture, and wherein step (c) includes positioning the socket onto the ball.

5. The method as set forth in claim 4 further including the steps of mounting a second ball radially outwardly of the first ball on the headstock positioner, mounting a mating ball-receiving portion radially outwardly of the socket on the headstock end of the fixture, and moving the fixture, thereby slidably engageing the second ball and mating ball-receiving portion, thereby constraining the fixture for rotation in unison with the headstock positioner.

6. The method as set forth in claim 1 further including the steps of providing a slidably engageable outboard alignment device a substantial distance radially outwardly of the rotational axis, and providing a mating engaging device on the headstock end of the fixture, and sliding the alignment device into contact with the mating engaging device, thereby constraining the fixture and headstock positioner for rotation in unison.

7. The method as set forth in claim 1 further including supporting the fixture on the headstock and tailstock positioners substantially independently of fasteners while rotating the fixture generally about the rotational axis.

8. The method as set forth in claim 7 further including the step of rotating the fixture off axis with respect to the rotational axis and causing relative movement between the mounting and mating structures at the headstock end of the fixture.

9. The method as set forth in claim 1 further including, after the step of locating, the step of vertically moving the headstock and tailstock positioners generally in unison but with some differential vertical movement of the positioners without binding of the fixture, by causing relative movement between the mounting and mating structures at the headstock end of the fixture.

10. A method of connecting an elongated fixture to rotatable headstock and tailstock positioners for rotation about a rotational axis, the fixture having a headstock end and a tailstock end, the method comprising the steps of:
    (a) providing selectively engageable mounting structure on the headstock positioner;
    (b) attaching a complementary mating structure on the headstock end of the fixture;
    (c) attaching a roller on the tailstock end of the fixture;
    (d) supporting a roller-receiving assembly including roller guide structure on the tailstock positioner;
    (e) locating the headstock end of the fixture with respect to the headstock positioner, said step of locating including moving the fixture generally in a direction parallel to the axis of rotation to a position wherein the mating structure engages the mounting structure; and
    (f) locatinq the fixture both linearly and centrally with respect to both the headstock and tailstock positioners, said step of locating including lowering the tailstock roller onto the roller-receiving assembly while simultaneously urging the roller and fixture to a preselected axial location by engaging the roller and roller guide structure.

11. The method as set forth in claim 10 wherein the step (c) includes attaching a tapered roller to the tailstock end, and the step (d) includes supporting a grooved roller assembly on the tailstock positioner, said step (f) further including lowering the tapered roller into the groove of the roller assembly.

12. The method as set forth in claim 11 wherein step (d) further includes providing the grooved roller assembly with a pair of spaced, grooved rollers and step (f) includes cradling the tapered roller between the grooved rollers.

13. The method as set forth in claim 10 wherein step (a) includes mounting a ball on the headstock positioner on the rotational axis and the step (b) includes mounting a complementary socket on the headstock end of the fixture, and wherein step (e) includes positioning the socket onto the ball.

14. The method as set forth in claim 13 further including the steps of mounting a second ball radially outwardly of the first ball on the headstock positioner, mounting a mating ball-receiving portion radially outwardly of the socket on the headstock end of the fixture, and moving the fixture, slidably engaging the second ball and mating ball-receiving portion, thereby constraining the fixture for rotation in unison with the headstock positioner.

15. The method as set forth in claim 10 further including the steps of providing a slidably engageable outboard alignment device a substantial distance radially outwardly of the rotational axis, and providing a mating engaging device on the headstock end of the fixture, and sliding the alignment device into contact with the mating engaging device, thereby constraining the fixture and headstock positioner for rotation in unison.

16. The method as set forth in claim 10 further including the step of supporting the fixture on the headstock and tailstock positioners substantially independently of fasteners while rotating the fixture generally about the rotational axis.

17. The method as set forth in claim 16 further including the step of rotating the fixture off axis with respect to the rotational axis and causing relative movement between the mounting and mating structures at the headstock end of the fixture.

18. The method as set forth in claim 10 further including, after the step (f), the step of vertically moving the headstock and tailstock positioners generally in unison but with some differential vertical movement of the positioners without binding of the fixture, the step of moving including: preventing binding of the fixture by causing relative movement between the mounting and mating structures at the headstock end of the fixture.

19. A method of connecting an elongated fixture to rotatable headstock and tailstock positioners for rotation about a first rotational axis, the fixture having a headstock and a tailstock end, the method comprising the steps of:
(a) providing mounting structure on the headstock positioner and complementary mounting means on the headstock end of the fixture for slidable engagement of the mounting structure and complementary mating structure by movement of the fixture generally in the axial direction;
(b) providing a roller with an axis on the tailstock end of the fixture and complementary roller receiving means on the tailstock positioner for receiving the roller in a direction generally perpendicular to the first axis;
(c) centering the headstock end of the fixture with respect to the headstock fixture, said step of centering including moving the complementary mounting means generally along the first axis, thereby engaging said complementary mounting means with the mounting structure; and
(d) moving a second tailstock roller in the direction generally perpendicular to the first axis onto the complementary roller receiving means and simultaneously urging the roller along the first axis to a preselected location relative to the roller receiving means, thereby centrally locating the elongated fixture in the axial direction.

20. The method as set forth in claim 19 wherein the step (d) further includes substantially locating the axis of the roller on the rotational axis by moving the roller in a third direction generally perpendicular to both the first axis and the second direction.

21. The method as set forth in claim 19 wherein step (a) includes slidably receiving the complementary mounting means in the selectively engageable mounting structure, and the step (d) includes sliding the complementary mounting means with respect to a selectively engageable mounting structure as a fixture is located along the first axis.

* * * * *

UNITED STATES PATENT AND TRADEMARK OFFICE
CERTIFICATE OF CORRECTION

PATENT NO.   :   4,713,873

DATED        :   22 December 1987

INVENTOR(S)  :   Raymond Dee Gold et al

It is certified that error appears in the above-identified patent and that said Letters Patent is hereby corrected as shown below:

Claim 10, line 8, change "complementary" to -- complementary --; and line 20, change "locatinq" to -- locating --.

Claim 14, line 6, after "fixture,", insert -- thereby --.

Claim 21, lines 5 and 6, change "a" to -- the --.

Signed and Sealed this

Twenty-sixth Day of July, 1988

*Attest:*

DONALD J. QUIGG

*Attesting Officer*    *Commissioner of Patents and Trademarks*